C. GMEINER & C. SCHOTTLER.
CORN-PLANTER.
No. 170,728.  Patented Dec. 7, 1875.
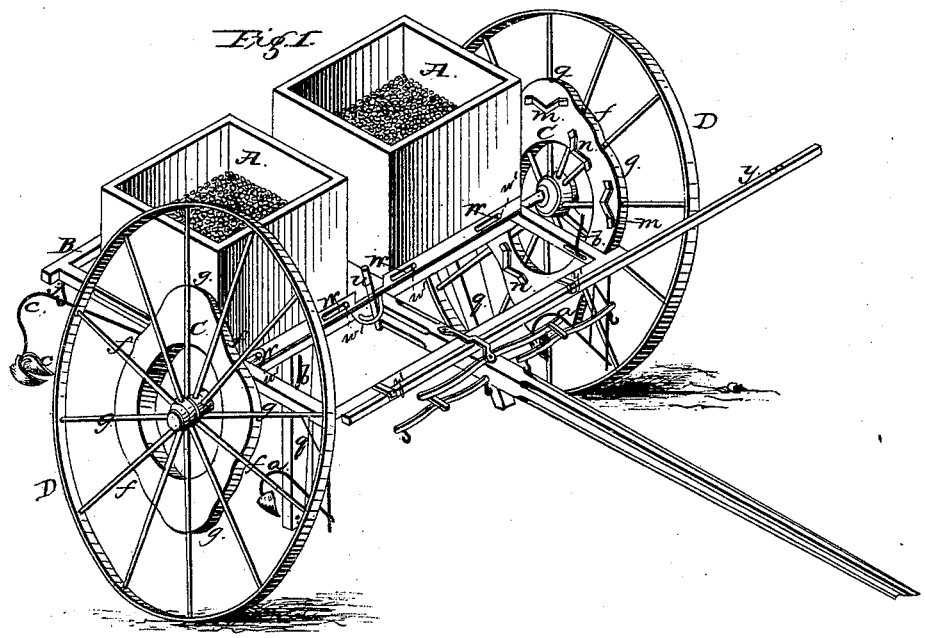
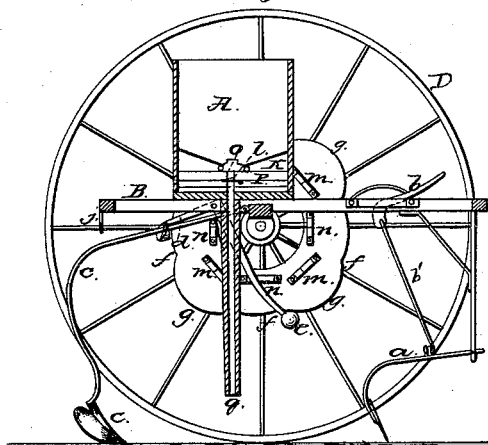
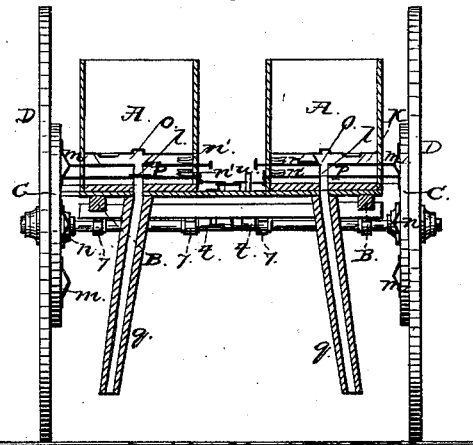
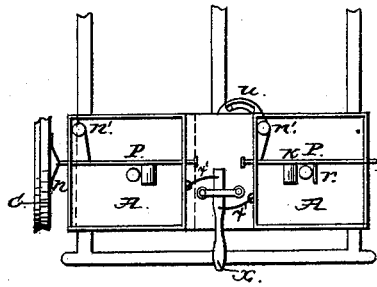

UNITED STATES PATENT OFFICE.

CONRAD GMEINER AND CHRISTOPH SCHÖTTLER, OF DALE, WISCONSIN.

IMPROVEMENT IN CORN-PLANTERS.

Specification forming part of Letters Patent No. 170,728, dated December 7, 1875; application filed August 26, 1875.

*To all whom it may concern:*

Be it known that we, CONRAD GMEINER and CHRISTOPH SCHÖTTLER, of the town of Dale, Outagamie county, State of Wisconsin, have invented a new and useful Improvement in Corn-Planters, of which the following is a specification:

Our invention is that of a double or single row corn-planter, to be drawn by one or two horses, making two or one rows or furrows, as may be desired, dropping the corn therein and covering the same as soon as dropped. Thus the one machine and the one action digs the furrow, plants the seed, and covers the same with earth, thus completing the whole process of corn-planting.

The invention consists in the combination and arrangement of parts, as herein fully described, and pointed out in the claims.

Figure 1 is an isometrical plan of the machine; Fig. 2, side elevation through grain-box, showing cam arrangement, its connections, and the carriage on the opposite side, or the wheel; Fig. 3, end elevation from the rear, showing cross-section through grain-boxes, &c.; Fig. 4, a section of ground plan, showing position of grain-boxes, valve arrangements, &c.

B is the carriage-frame, supported upon wheels D in the usual manner. *a* are adjustable plows or hoes, for forming two parallel furrows for the corn, and are adjusted either in or out of working position by levers *b*, connecting-rods *b'*, as clearly shown in Figs. 1 and 2. *c* are forked hoes, for covering the corn, and are operated through the medium of elbow-levers *d*, each having on the end thereof a small friction-wheel, *e*, which works on the outer edges of cam-wheels C, attached to, and revolving with, the carriage-wheels D, so that when the wheels *e* are at *f*, the hoes are in the ground, and when at *g* are raised out of the ground. The hoes *c* when not in use are suspended from hooks *j* out of working position with the cam-wheels C. A are the grain or seed boxes, each being provided with double cut-off valves *k* and *p*. The cut-off valves *k* are operated through the medium of a series of cams or projections, *m*, arranged on the inside faces of the cam-wheels C and coiled springs *n'*, which return the cut-off valves to their normal positions, when released from contact with the cams or projections *m*.

The cut-off valves *k*, when moved transversely by the cams or projections *m*, allow the grain to pass from the main portion of the seed-boxes into a receptacle, *l*, in the lower part of each one thereof, which hold from five to seven kernels of corn. When said cut-off valves *k* are returned to their normal position, cut-off valves *p* open, and allow the grain to pass from the receptacles *l* into the spouts *g*, which conduct it into the furrows formed by the plows or holes *a*. The cut-off valves *p* are also operated through the medium of a series of cams or projections, *n*, on the inside faces of the cam-wheels C, and arranged to alternate with the series of cams or projections *m* thereon, which allow the cut-off valves *k* and *p* to operate alternately in opening and closing the openings through which the grain passes. The cut-off valves *p* are also returned to their normal position when released from contact with the cams or projections *n*, by coiled springs *n'*. Each of the cut-off valves *k* is provided with a feeder, *r*, to push the grain into the holes over the receptacles *l*.

The grain or seed boxes are movably secured to, and held in position upon, the carriage-frame, by slotted brackets *w*, and pins *w'*, as clearly shown in Fig. 1, whereby the boxes can be moved together or separately, toward or from each other, by means of a lever, *x*, and two connecting-rods, *x'*, so that the cut-off valves *k* and *p* can be put either in or out of working position with the cams or projections *m* and *n*, as desired.

Either one of the rods *x'* can be disconnected from the lever *x* when it is desired to move only one of the boxes.

The axle is formed in two parts and coupled together by a clutch, *t*, and secured to the carriage-frame by bearings 7. The clutch is operated by a lever, *u*, and coiled spring *u'*, when it is desired to connect or disconnect the two parts of the axle. The object in forming the axle in two parts is that the wheels can be operated together or separately in planting one or two rows of corn.

*y* is a marking-rod, secured to the front of the carriage-frame by clasps *y'*, so that it can be adjusted transversely, for the purpose of denoting the distance from the row last planted, or in keeping the proper distance from it.

From the foregoing description, it will be perceived that one or two rows can be planted at the same time, if desired, as the plows or hoes and seed-boxes can be separately thrown in and out of working position when desired.

What we claim as our invention, and desire to secure by Letters Patent, is—

1. The combination, with the grain or seed box A, receptacle $l$, and spout $g$, of the double cut-off valves $k$ and $p$, feeder $r$, and alternating cams or projections $m$ and $n$, all constructed and arrange to operate substantially as and for the purpose specified.

2. The combination, with the grain or seed boxes A A, of the axle, formed in two parts, and the central coupling $t$ sliding upon one portion thereof, arranged to operate substantially as and for the purpose specified.

CONRAD GMEINER.
CHRISTOPH SCHÖTTLER.

Witnesses:
T. R. HUDD,
A. H. KELLOGG.